(12) United States Patent
Schopf

(10) Patent No.: US 12,417,869 B2
(45) Date of Patent: Sep. 16, 2025

(54) ELECTROMAGNETIC ACTUATOR

(71) Applicant: MICRO-EPSILON-MESSTECHNIK GMBH & CO. KG, Ortenburg (DE)

(72) Inventor: Tobias Schopf, Haarbach (DE)

(73) Assignee: MICRO-EPSILON-MESSTECHNIK GMBH & CO. KG, Ortenburg (DE)

( * ) Notice: Subject to any disclaimer, the term of this patent is extended or adjusted under 35 U.S.C. 154(b) by 354 days.

(21) Appl. No.: 18/246,967

(22) PCT Filed: Nov. 2, 2021

(86) PCT No.: PCT/DE2021/200170
§ 371 (c)(1),
(2) Date: Mar. 28, 2023

(87) PCT Pub. No.: WO2022/089698
PCT Pub. Date: May 5, 2022

(65) Prior Publication Data
US 2023/0377788 A1   Nov. 23, 2023

(30) Foreign Application Priority Data

Oct. 30, 2020   (DE) ............... 10 2020 213 699.8

(51) Int. Cl.
   *H01F 7/14*   (2006.01)
   *G02B 26/08*   (2006.01)
   *H01F 7/08*   (2006.01)

(52) U.S. Cl.
   CPC ............ *H01F 7/14* (2013.01); *G02B 26/085* (2013.01); *H01F 7/081* (2013.01)

(58) Field of Classification Search
   CPC ........................................... H01F 7/14
   See application file for complete search history.

(56) References Cited

U.S. PATENT DOCUMENTS

| | | | | |
|---|---|---|---|---|
| 6,002,184 A * | 12/1999 | Delson | ............... | H02K 23/00 341/20 |
| 8,674,795 B2 * | 3/2014 | Reuber | ............... | H01H 36/00 335/277 |
| 2009/0039989 A1 * | 2/2009 | Reuber | ............... | H01H 33/666 335/127 |

(Continued)

FOREIGN PATENT DOCUMENTS

| | | |
|---|---|---|
| DE | 102012220925 A1 | 11/2013 |
| DE | 102013208768 A1 | 11/2014 |
| EP | 1001512 A2 | 5/2000 |

OTHER PUBLICATIONS

International Search Report and Written Opinion for PCT/DE2021/200170 (ISA/EP) mailed Feb. 22, 2022 w/English translation (19 pages).

(Continued)

*Primary Examiner* — Edmond C Lau
(74) *Attorney, Agent, or Firm* — ALSTON & BIRD LLP

(57) ABSTRACT

The invention relates to an electromagnetic actuator having a magnetic circuit comprising at least two, preferably three, magnetic circuit elements, wherein the magnetic circuit elements exert an attracting or repelling force on one another such that the actuator effects a movement, wherein the position of at least one of the magnetic circuit elements relative to another magnetic circuit element can be adjusted in order to influence the actuator rigidity.

12 Claims, 15 Drawing Sheets

(56) References Cited

U.S. PATENT DOCUMENTS

2016/0111238 A1* 4/2016 Cheng .................. H01H 50/64
  335/187
2017/0261859 A1 9/2017 Hauf et al.

OTHER PUBLICATIONS

English Translation of the International Preliminary Report on Patentability for PCT/DE2021/200170 mailed May 11, 2023 (8 pages).

* cited by examiner

ELECTROMAGNETIC ACTUATOR

CROSS REFERENCE TO RELATED APPLICATIONS

This application is a National Stage Application, filed under 35 U.S.C. § 371, of International Application No. PCT/DE2021/200170, filed Nov. 2, 2021, which international application claims priority to and the benefit of German Application No. 10 2020 213 699.8, filed Oct. 30, 2020; the contents of both of which as are hereby incorporated by reference in their entireties.

BACKGROUND

Technical Field

The invention relates to an electromagnetic actuator having a magnetic circuit comprising magnetic circuit elements.

Description of Related Art

The prior art contains actuators for which the mechanical rigidity of a flexure is partially or entirely compensated by a negative rigidity of the actuator. The negative rigidity is caused by the attracting force of permanently-magnetic regions.

The flexure and actuator tolerances are in this case cumulative and must be held within certain limits in the context of the manufacturing process.

The production of a flexure with a constant rigidity over the series dispersion places high demands on the mechanical tolerances, since the rigidity sometimes even changes cubically with the individual dimensions of the flexure. It is therefore not uncommon to have to tolerate mechanical dimensions in the micrometer range in order to remain within the required rigidity limits.

Once permanent magnets are used in the design of an electromagnetic actuator, there are forces between the stator and rotor in the unpowered state. These forces manifest themselves as "rigidities" during movements between the stator and rotor. The magnitude of this so-called passive actuator rigidity is strongly dependent on the geometric design of the actuator, the tolerances of the air gaps, the magnet tolerances and the concrete magnetic resistance of the magnetic flux guide. Due to strong nonlinearities of the magnetic field, the passive actuator rigidity as well as the flexure is highly dependent on mechanical tolerances.

In an ideal system design, one wants to control the rigidities of the actuator and flexure in such a way that a targeted system behavior is set. For example, with a very low system rigidity, static operation with a low power consumption is possible. For dynamic operation, it can be advantageous, for example, to set the system resonant frequency specifically to a certain frequency for optimum control operation in the application.

In general, the following applies to the resonant frequency of spring-mass systems:

$$f_{res} = \frac{1}{2\pi} \sqrt{\frac{c_{sys}}{m}}$$

The mass "m" is usually given, constant and cannot fall below a certain minimum size due to the application. This leaves only the system rigidity for setting the system resonance, which is composed of flexure and actuator rigidity as follows:

$$c_{sys} = c_{flexure} + c_{actuator}$$

The state of the art includes elements that influence the system rigidity purely mechanically (e.g. lever arm modification, springs that can be locked along their length, individual mechanical reworking, etc.). However, all these solutions place high demands on space requirements, complexity and, above all, mean a high level of effort in production.

A relatively soft design of the flexure in the desired degree of freedom of movement entails the disadvantage that parasitic rigidities are correspondingly soft. This is where the advantage of selective partial compensation of the flexure rigidity by the actuator rigidity becomes apparent. The joint can be designed to be relatively rigid overall, and only the desired degrees of freedom are reduced in rigidity by the opposing force of the permanently magnetic regions.

BRIEF SUMMARY

It is the task of the invention to design and further develop the electromagnetic actuator mentioned above in such a way that it is simple in construction and inexpensive in manufacture. Moreover, the electromagnetic actuator is to be distinguished from the prior art and therefore from competitive products. It is further the task or object of the invention to avoid the disadvantages of very tight manufacturing tolerances and when operating the actuator, and to permit an actuator that is simple to manufacture, cost-effective, and adjustable in its rigidity.

This object is achieved by an electromagnetic actuator according to the broadest claim. Pursuant thereto, the magnetic circuit elements exert an attracting or repelling force on one another such that the actuator effects a movement, wherein the position of at least one of the magnetic circuit elements relative to another magnetic circuit element can be adjusted in order to influence the actuator rigidity.

In principle, an electromagnetic actuator can consist of two magnetic circuit elements. A first magnetic circuit element can be adapted in the form of a coil that generates a magnetic field as soon as it is energized by a current.

A second magnetic circuit element can be adapted in the form of a permanently magnetic region that either consists of a permanent magnet or a permanently magnetized region of the actuator.

Assuming the coil is energized by current, a force between the magnetic field of the coil generated in this manner and the magnetic field of the permanently magnetic region can already be exerted in this minimalistic configuration. The force can be controlled by the current flow through the coil. One could label the force generated in this manner as the "controllable force", which embodies the nature of the actuator, namely to generate a movement by controlling the force.

One could speak of a "static force", which represents the rigidity of the overall system. This static force is firstly determined by the mechanics of the actuator and secondly by the static magnetic force (generated by permanent magnets). If the actuator contains a third magnetic circuit element, the static magnetic force is zero since no magnetic force acts when current does not flow.

According to the invention, a third magnetic circuit element (permanently magnetic region or magnetically conductive material) is therefore essential. The cooperation between the second and third magnetic circuit element generates a "static" force by the static magnetic field acting between the magnetic circuit elements, thus generating a rigidity that (due to the nonlinearity of the magnetic field) depends on the distance between the second and the third magnetic circuit element. Based thereon, the actuator rigidity, and therefore also the overall rigidity of the system can be adjusted by adjusting the distance between the second and third magnetic circuit element.

In principle, an electromagnetic actuator consists of a magnetic circuit having magnetic circuit elements that are intended to generate, conduct, or amplify magnetic flux. The cooperation of the magnetic circuit elements in a suitable arrangement exerts a force that ultimately results in a movement. The magnetic circuit elements can be coils, permanently magnetic regions, or magnetically conductive elements that can be arranged in various ways, depending on the actuator type and application. The correct configuration with regard to power requirement, space requirements, desired range of movement, and other specifications must always be found for the corresponding application. A commonality of all these configurations is the combination of coil, permanent magnet, and magnetically conductive material. The central element of this invention is the capability to influence the actuator rigidity in a controlled way.

The invention relates to actuators having a first magnetic circuit element in the form of a coil that generates a magnetic field as soon as it is energized by current.

The actuator also contains a second magnetic circuit element in the form of a permanently magnetic region. The permanently magnetic region can consist of a permanent magnet or a permanently magnetic region of the actuator. The permanently magnetic region can either be located in the stator ("Hybrid Reluctance Actuator") or in the rotor of the actuator ("Lorenz Actuator").

The strength and direction of the magnetic field of the first magnetic circuit element (coil) is controllable by the current strength and direction. As soon as current flows through the first magnetic circuit element it exerts a force on the second magnetic circuit element that is controllable by the current flow, the force either being attracting (given suitable poling or para-magnetism) or repelling (given corresponding poling or diamagnetism).

The actuator further contains a third magnetic circuit element in the form of a further permanently magnetic region or a magnetically conductive material. The third magnetic circuit element is intended to shape, guide, or amplify the magnetic field of the first or second magnetic circuit element. The cooperation of the second and third magnetic circuit element generates a static force by the static magnetic field in-between, the static force (due to the nonlinearity of the magnetic field) depending on the distance between the second and third magnetic circuit element.

The overall system has a rigidity that is made up of the actuator rigidity (substantially corresponding to the rigidity of the magnetic field) and the mechanical rigidity (substantially corresponding to the rigidity of the flexure):

$$c_{sys} = c_{flexure} + c_{actuator}$$

The mechanical rigidity is predetermined and constant based on the design of the actuator.

The actuator rigidity results from the static magnetic field that is formed between the second and the third magnetic circuit elements. If the third magnetic circuit element is also a permanently magnetic region, this results in an attracting or repelling force depending on the poling, and therefore in a negative or positive rigidity. The resulting force is attracting if the third magnetic circuit element is a magnetically conductive, paramagnetic material.

The actuator rigidity can be inventively adjusted by providing an adjustable magnetic circuit element whose position is adjustable relative to the position of a further magnetic circuit element.

A purposeful adjustment of the adjustable magnetic circuit element modifies the air gap in the magnetic circuit, and a desired rigidity is adjusted due to the dependency of the force on the air gap size. The relationship between the force F and the position z of the adjustable magnetic circuit element (or air gap) is nonlinear.

The first derivative of force over the position corresponds to the actuator rigidity $c_{actuator}$, which depends on the position z:

$$\frac{dF}{dz} = -c(z)_{actuator}$$

This also applies entirely analogously for the torque M as a function of the rotational angle ω:

$$\frac{dM}{d\varphi} = -c(\varphi)_{actuator}$$

Due to the nonlinearity of the magnetic field, the rigidity is also modifiable by the position of the adjustable magnetic circuit element.

Depending on the arrangement in the actuator or its design, the adjustable magnetic circuit element can be the second magnetic circuit element (permanently magnetic region), or the third magnetic circuit element (permanently magnetic region or magnetically conductive material). The adjustable magnetic circuit element is adapted such that its position can be adjusted relative to a further magnetic circuit element using suitable adjustment means.

Adjustment means can be electrical, pneumatic, thermal, or mechanical means, by which a position is adjustable permanently or also dynamically. Mechanical adjustment means have a particularly simple design and are therefore cost-effective and energy-conserving.

The simplest mechanical adjustment means are e.g. washers in a suitable thickness.

A more elegant approach is the adjustment using a guide in which the magnetic circuit element is guided and secured with a clamping device, for example by a lateral setscrew.

The adjustment element can also be a screw by which the position of the magnetic circuit element is adjusted.

A particularly simple adjustment of the position is possible when a magnetic circuit element itself forms the adjustable element. The magnetic circuit element can for example have a thread, for example a precision thread. The adjustable magnetic circuit element can then be adjusted in its position, for example using a nut, a screw, etc., means engaging into the thread. It is particularly advantageous when the adjustable magnetic circuit element is rotatably guided in its mount, for example the coil carrier, which has a corresponding opposing thread, and is therefore adjustable.

The adjustment of the actuator rigidity can be adjusted to a predetermined value when the actuator is manufactured. It is also conceivable to adjust the actuator rigidity in the respective application only when the actuator is installed. This can be necessary when the resonance frequency and the overall system is changed in the application by additional mass, for example a mirror mounted onto a one-axis or two-axis actuator, and the rigidity must be readjusted as a result.

The position of the adjustable magnetic circuit element could also be adjusted by an electromechanical adjustment. This would also permit automating an adjustment, for example with an automated calibration during manufacturing or in the application itself. The adjustment could then also be performed variably during operations. One could then dynamically adjust the actuator rigidity of the system and therefore its resonance frequency, for example to optimize power consumption or to perform resonant scanning. Resonant scanning in this case means that the actuator rigidity is controlled such that the resonance frequency of the actuator matches the base frequency of the desired movement.

The adjustability is particularly advantageous for actuators that perform a motion in two or more axes. Such actuators can for example perform a tilt movement about one axis or also about two axes displaced in relation to each other by 90°. A home position must frequently be adjusted on such actuators. Without adjustability, all mechanical elements and in particular also the magnetic circuit elements would need to be manufactured and arranged with the tightest tolerances. It is substantially easier and more cost-effective if the adjustment is made during or after manufacturing the actuator by a simple adjustment of the position of at least one magnetic circuit element, by which manufacturing tolerances of the mechanism (in particular of the flexure) and the actuator (magnetic rigidity) are compensated with the calibration procedure. As a result, the natural resonances of the overall system are purposefully adjustable based on manufacturing tolerances, and are therefore reproducible. This results in a reproducible power consumption of the actuator, resulting in a constantly usable controller design.

Such actuators are for example used to guide light in certain spatial directions ("Fast Steering Mirror"). A mirror is for this purpose mounted on the movable element of the actuator. It is particularly advantageous when the movable element itself acts as a mirror based on an appropriate reflective coating, because the actuated masses are in this case reduced, thus achieving high dynamics.

The advantages of the inventive actuator are:
Controlled adjustment of the system rigidity for the respective application.
The natural resonance of the system is reproducibly adjustable beyond manufacturing batches.
The natural resonance reproducibly adjustable with manufacturing tolerances results in a reproducible power consumption and a constantly usable controller design.
Manufacturing tolerances in the flexure and in the actuator are largely eliminated by the calibration procedure.

BRIEF DESCRIPTION OF THE FIGURES

There are various ways to advantageously configure and further develop the teaching of the present invention. For this purpose, reference is hereby made on the one hand to the claims dependent on claim 1, and on the other hand to the following explanation of preferred embodiments of the invention with reference to the drawings. In the context of the explanation of the preferred exemplary embodiment of the invention and of the drawing, other generally preferred embodiments and further developments of the teaching are explained as well. The drawing shows in FIG. 1 a schematic view of an exemplary embodiment of an inventive actuator, FIG. 2 a schematic view of a further exemplary embodiment of an inventive actuator, FIG. 3 a schematic view of a further exemplary embodiment of an inventive actuator, similar as in FIG. 1, FIG. 4 a schematic view of a further exemplary embodiment of an inventive actuator, with a function similar as in FIG. 1, FIG. 5 a schematic view of a further exemplary embodiment of an inventive actuator, similar as in FIG. 4, FIG. 6 a schematic view of a further exemplary embodiment of an inventive actuator, as an enhancement to FIG. 5, FIG. 7 a diagram with an exemplary force graph between the permanent magnet and the actuator core as a function of the distance between the permanent magnet and actuator core.

DETAILED DESCRIPTION OF VARIOUS EMBODIMENTS

Figure 1:
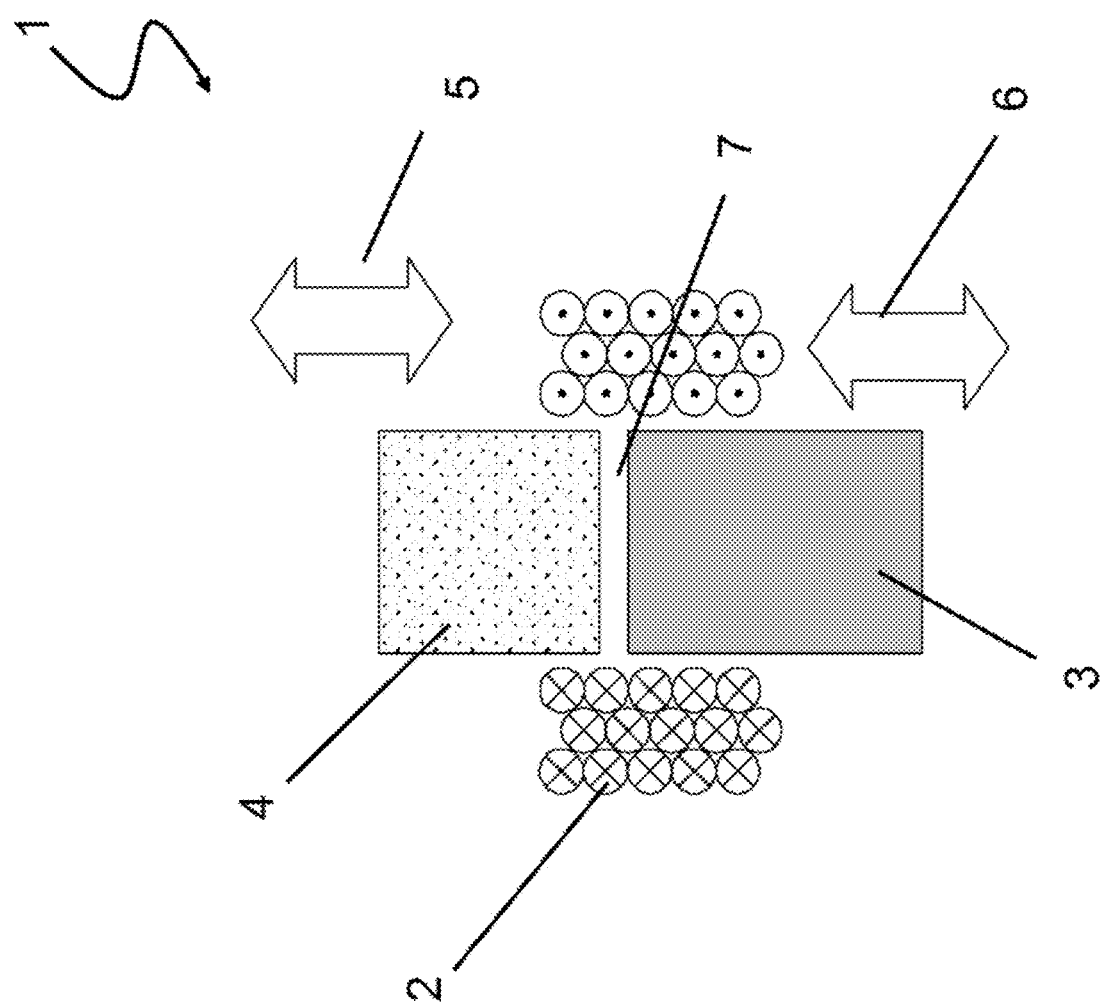

FIG. 1 shows an electromagnetic actuator 1 consisting of a coil 2, a core 3, and, as movable part, a permanently magnetic region 4, a permanent magnet in this example. An attracting force is exerted between the permanent magnets 4 and the actuator core 3. By energizing the coil 2 with current, this attracting force is amplified or weakened, depending on the direction of current flow. Depending on the mechanical suspension of the permanent magnet 4, this results in a movement change 5. The position of the actuator core in relation to the permanent magnet is adapted to be adjustable. The position is adjusted in axis direction 6. The variable gap 7 between the magnet results in a correspondingly variable rigidity of the actuator.

Figure 2:
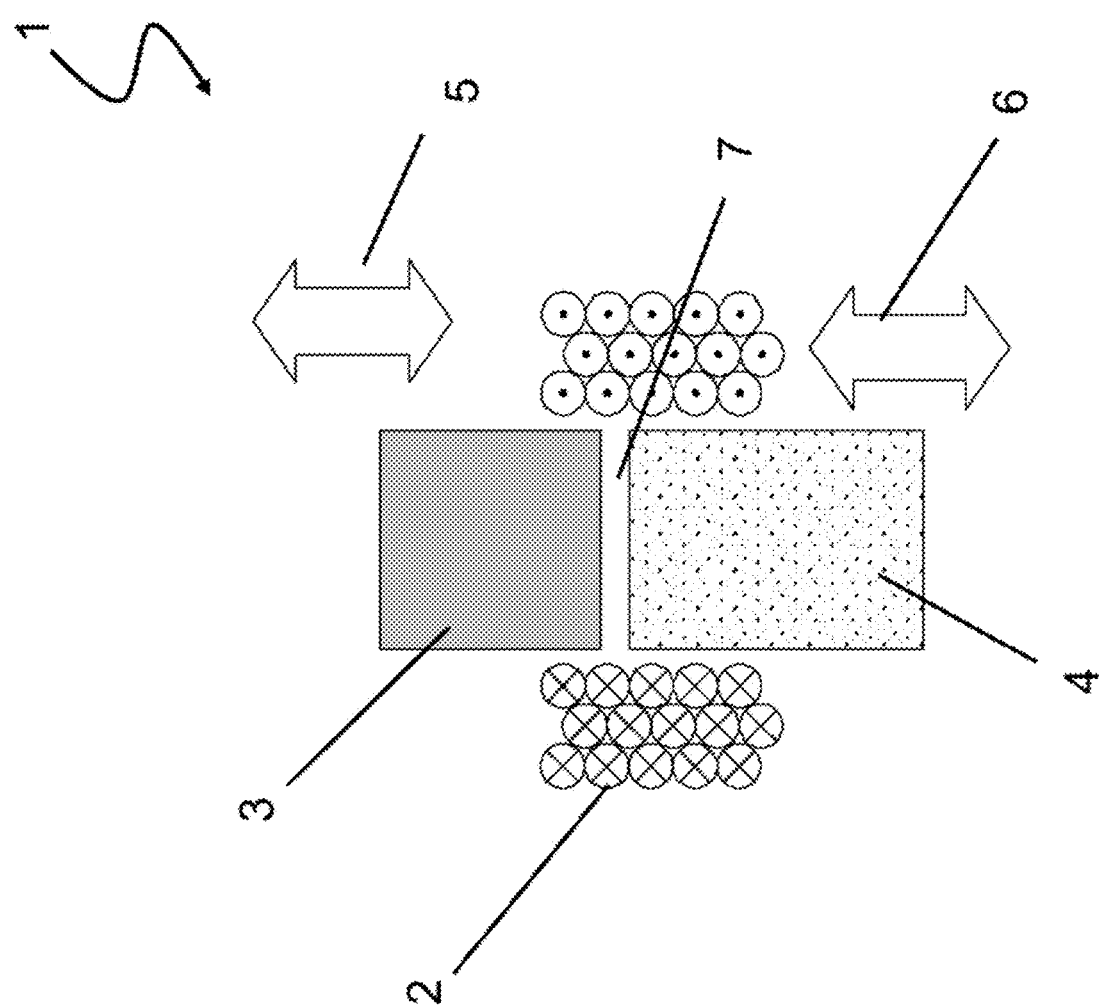

FIG. 2 shows an actuator 1 similar to the one in FIG. 1, with the difference that the core 3 now represents the movable part of the actuator, and the position of the magnet 4 is variable and is used for the rigidity adjustment.

Figure 3:
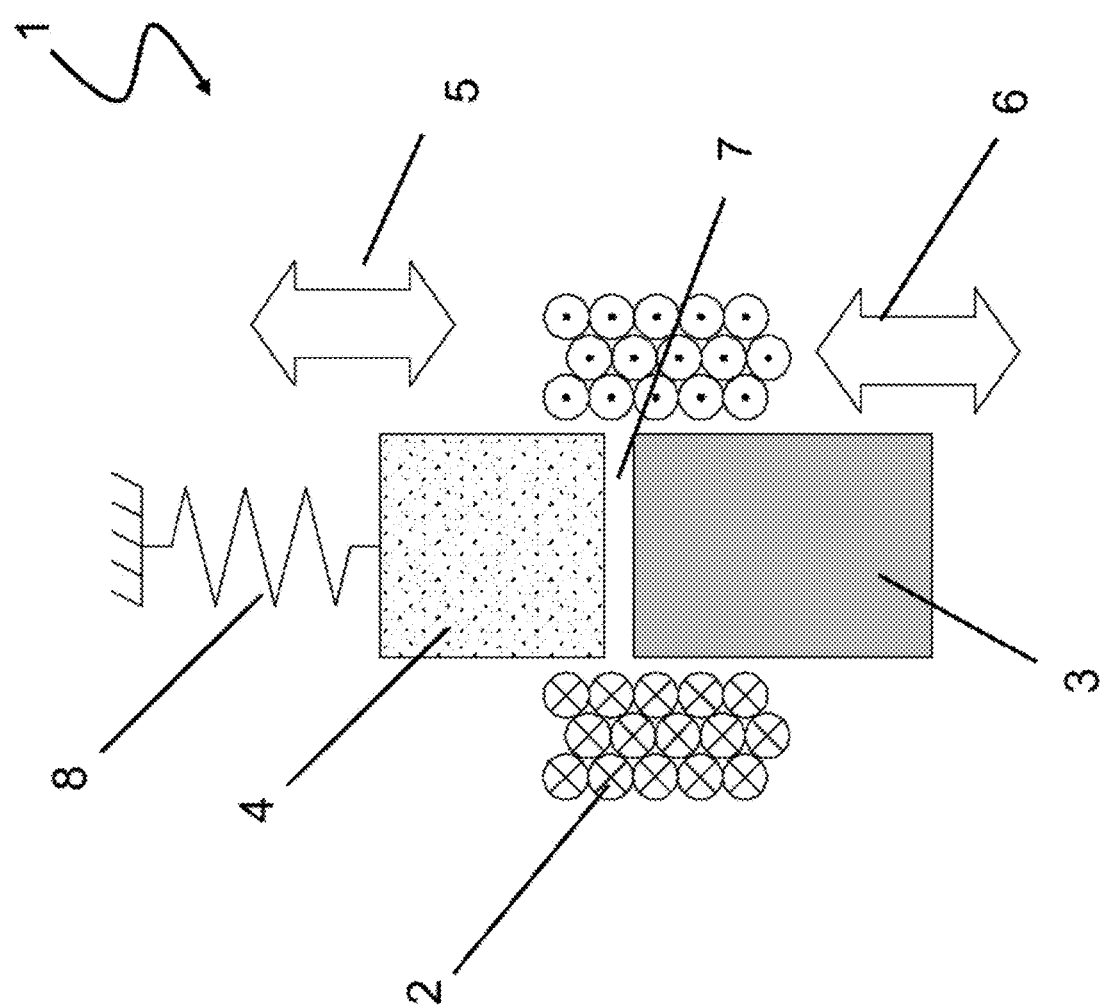

FIG. 3 shows an actuator like the one in FIG. 1, with the enhancement of a mechanical suspension acting as a flexure, and that is indicated as a spring 8. The mechanical rigidity of the flexure is partially or completely (depending on application desired resonance frequency) purposefully compensated by the actuator rigidity.

Figure 4:
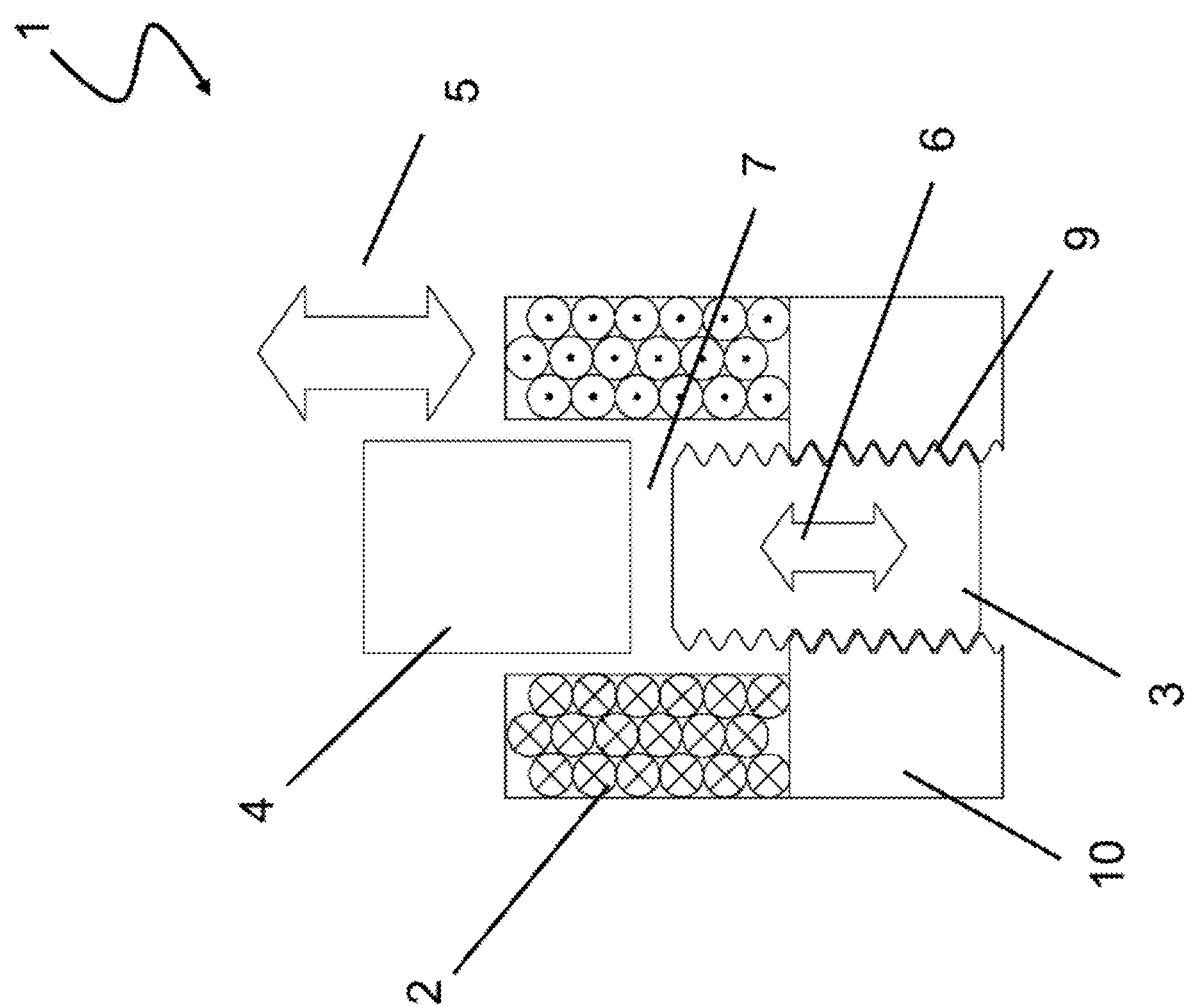

FIG. 4 shows an actuator having the same operating principle as the actuator from FIG. 1. In this specific example, the actuator core 3 was adapted as a cylinder having an outer thread 9, and that is arranged in a coil carrier 10 with a corresponding inner thread. Using the thread 9, the distance 7 of the core 3 to the permanent magnet 4 can be precision adjusted.

Figure 5:
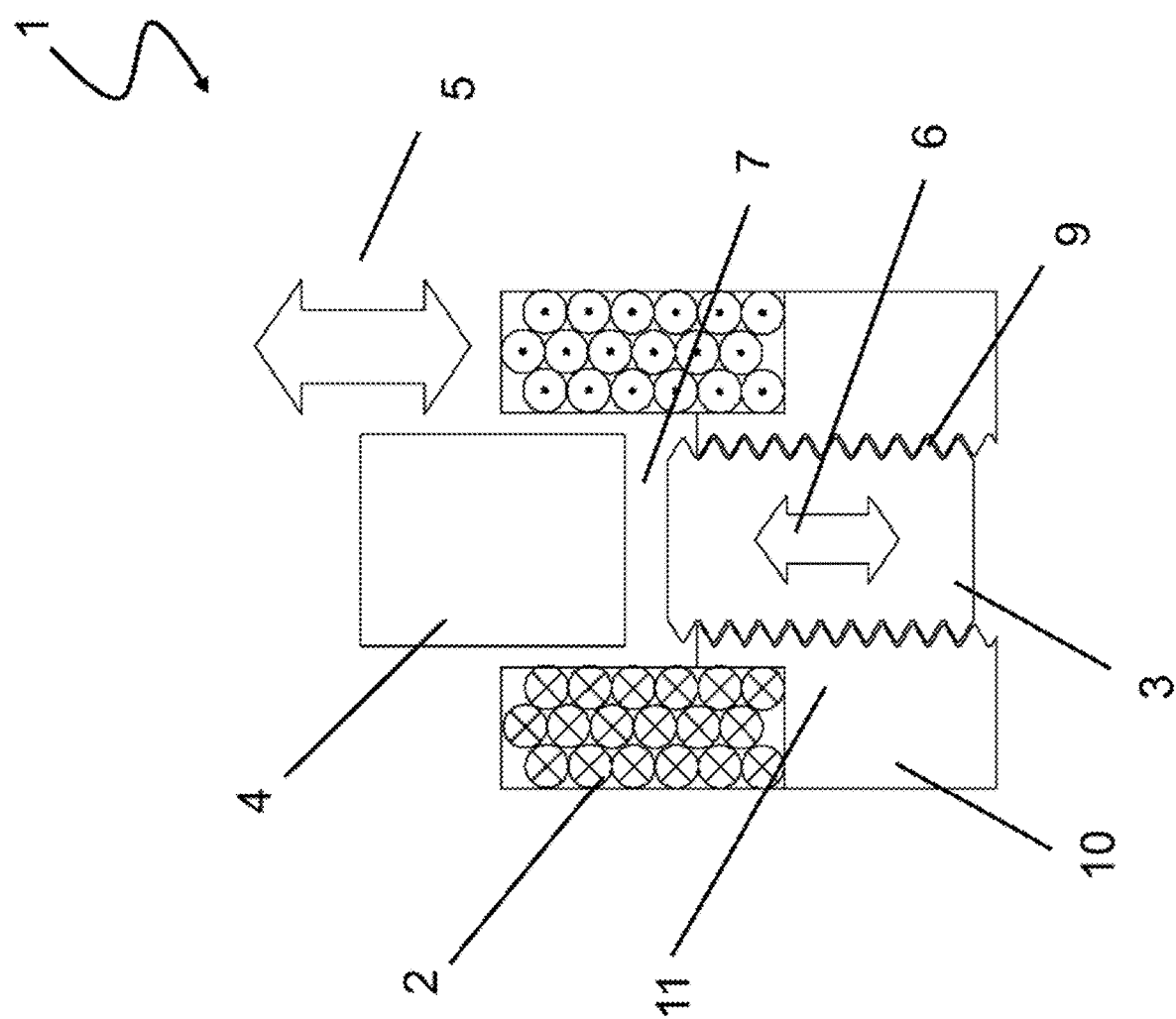

FIG. 5 shows an actuator like the one in FIG. 4 with the difference that the coil carrier 10 in which the actuator core 3 is adjusted, consists of a magnetically conductive material 11, just like the core 3. The coil carrier 10 made of magnetically conductive material serves to decrease the magnetic resistance in the magnetic circuit, and to increase the magnetic flux accordingly. This results in a higher actuator force at equivalent actuator power.

Figure 6:
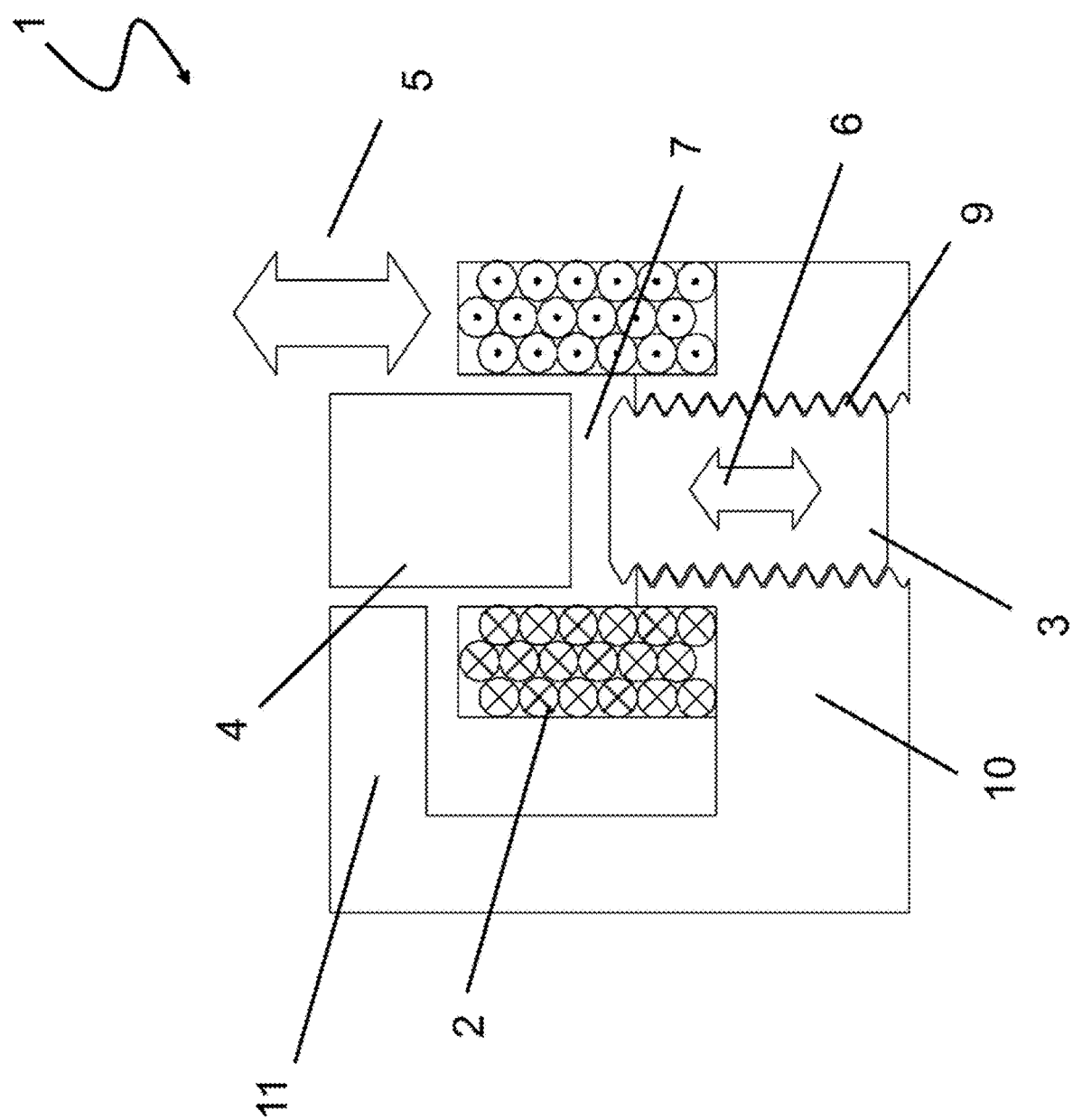

In comparison to FIG. 5, FIG. 6 shows a further option to reduce the magnetic resistance in actuator 1 by relying on magnetically conductive material 11 to guide the magnetic flow past the coil back toward the movable part of the actuator.

In principle, there are various actuator configurations that go beyond the shown examples. For the corresponding application, it is always necessary to find the correct configuration with respect to power requirements, space requirements, miscellaneous specifications, and desired range of movement. A commonality of all these configurations is the combination of coil, permanent magnet, and magnetically conductive material. The central element of this invention is an adjustable element in the actuator to influence the actuator rigidity in a controlled way.

Figure 7:
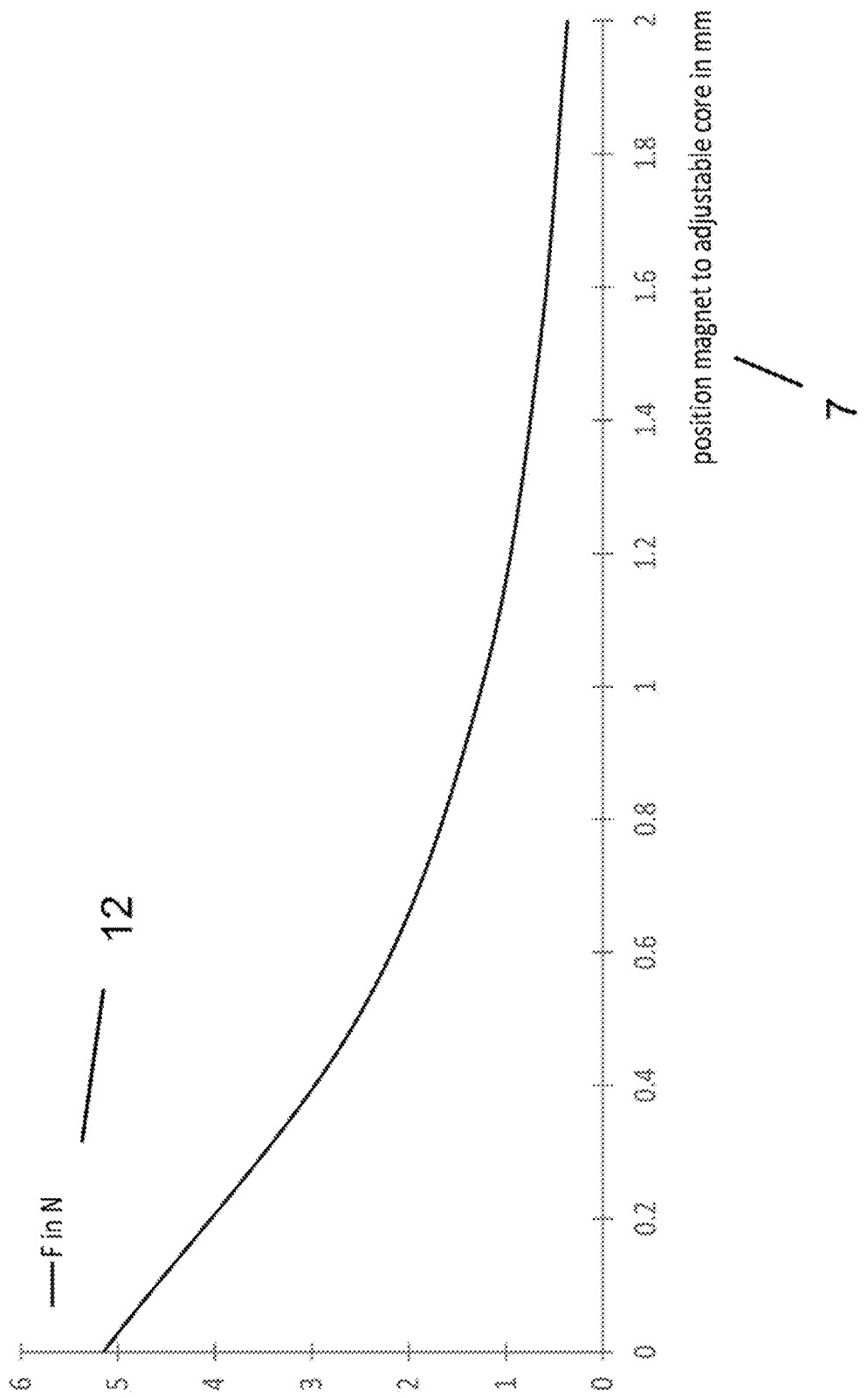

The diagram in FIG. 7 shows an exemplary graph of the force 12 between the permanent magnet 4 and the actuator core 3 as a function of the distance 7 between the permanent magnet and actuator core.

Figure 8:
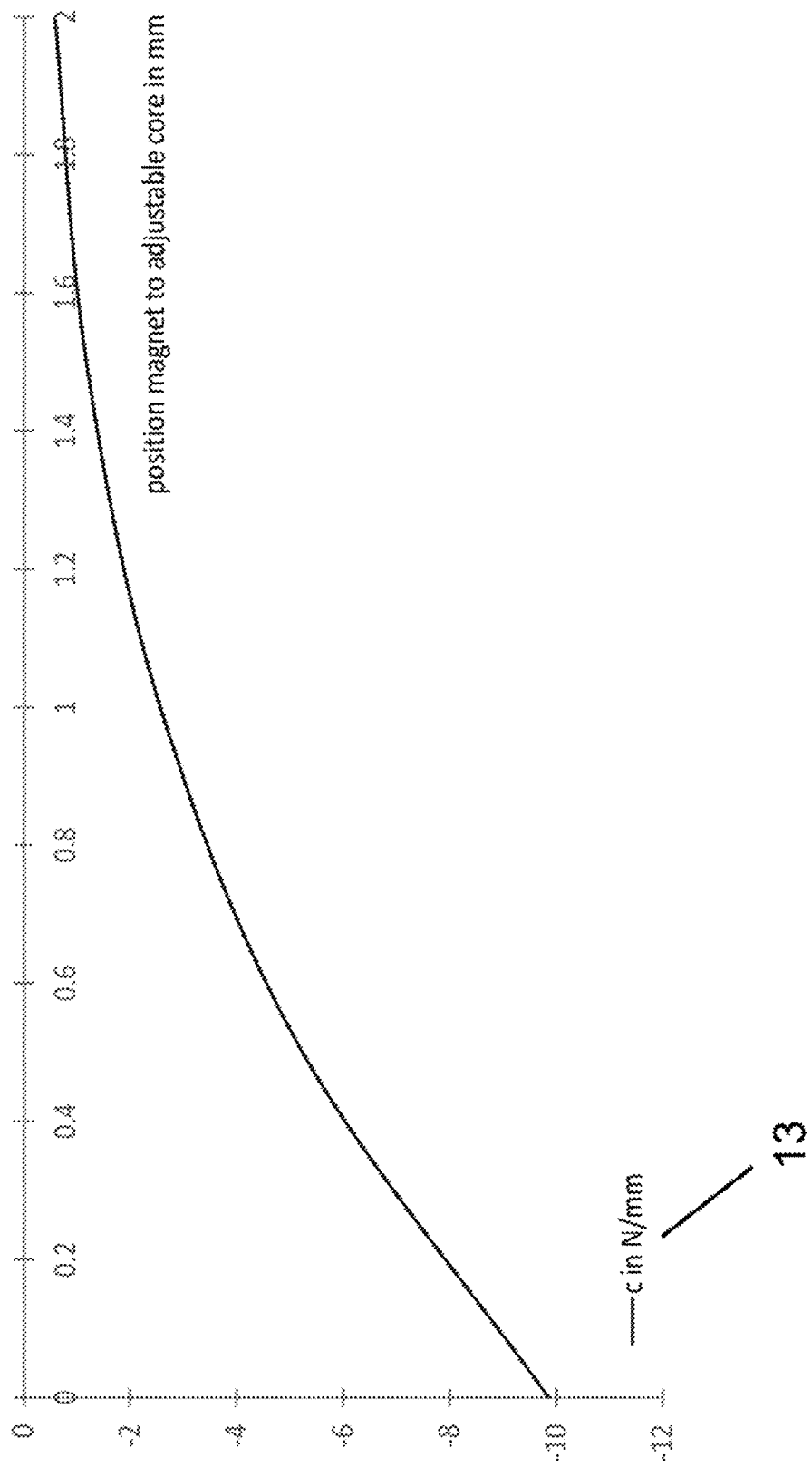
FIG. 8 the passive actuator rigidity in a diagram, as a first derivative over the distance between the core and magnet, FIG. 9 a schematic view of a mechatronic system with inventive actuators, FIG. 10 a schematic view of the system from FIG. 9 in the tilted state, FIG. 11 a schematic view of the system from FIG. 9 with a permanently magnetic region located in the stator in the base region of the flexure, FIG. 12 a diagram of the typical torque graphs of the actuator and the flexure as a function of the tilting of the system from the FIGS. 9 and 10, FIG. 13 a diagram of the compensation of the actuator and flexural rigidity in relation to an overall system rigidity, FIG. 14 a schematic view of a system expanded by a further actuator pair, and FIG. 15 the system from FIG. 14, in a schematic, cross-sectional view.

When one forms the first derivative over the distance between the core and magnet, one obtains the passive (coils not energized with current) actuator rigidity 13, which is shown in FIG. 8.

$$c = \frac{dF}{dx}$$

c: Actuator Rigidity
x: Position of Core in Relation to Magnet
F: Actuator Force The negative arithmetic sign indicates that the force increases as the distance decreases. The graph clearly shows the possible variability of the rigidity as a function of the core position.

Figure 9:
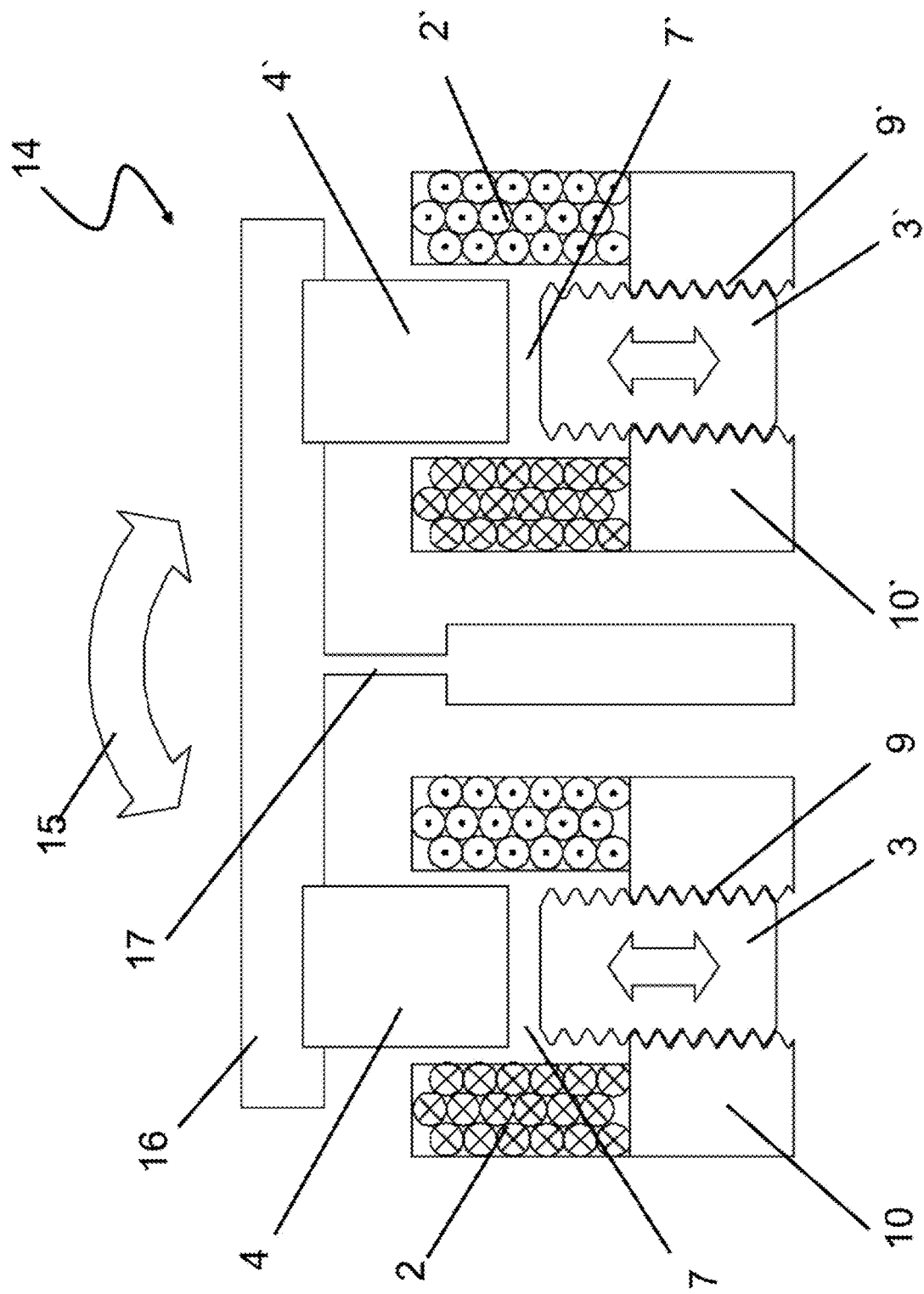

FIG. 9 shows a concrete mechatronic system 14 that executes the tilting 15 of the movable element 16. The mechanical suspension is on an exemplary basis adapted as a simple rod flexure 17. The actuator principle from FIG. 4 was used, and was symmetrically applied for both sides. In order to obtain a tilting motion, the two coils 2, 2' are respectively energized with current having different arithmetic signs. The coils 2, 2' are wound in the same orientation, which is indicated by crosses 18 and dots 19. The respective distance 7, 7' between the magnetic circuit elements 3, 3' and 4, 4' is adjusted using a precision thread 9, 9' such that the overall rigidity of the system is optimized for the respective application.

Figure 10:
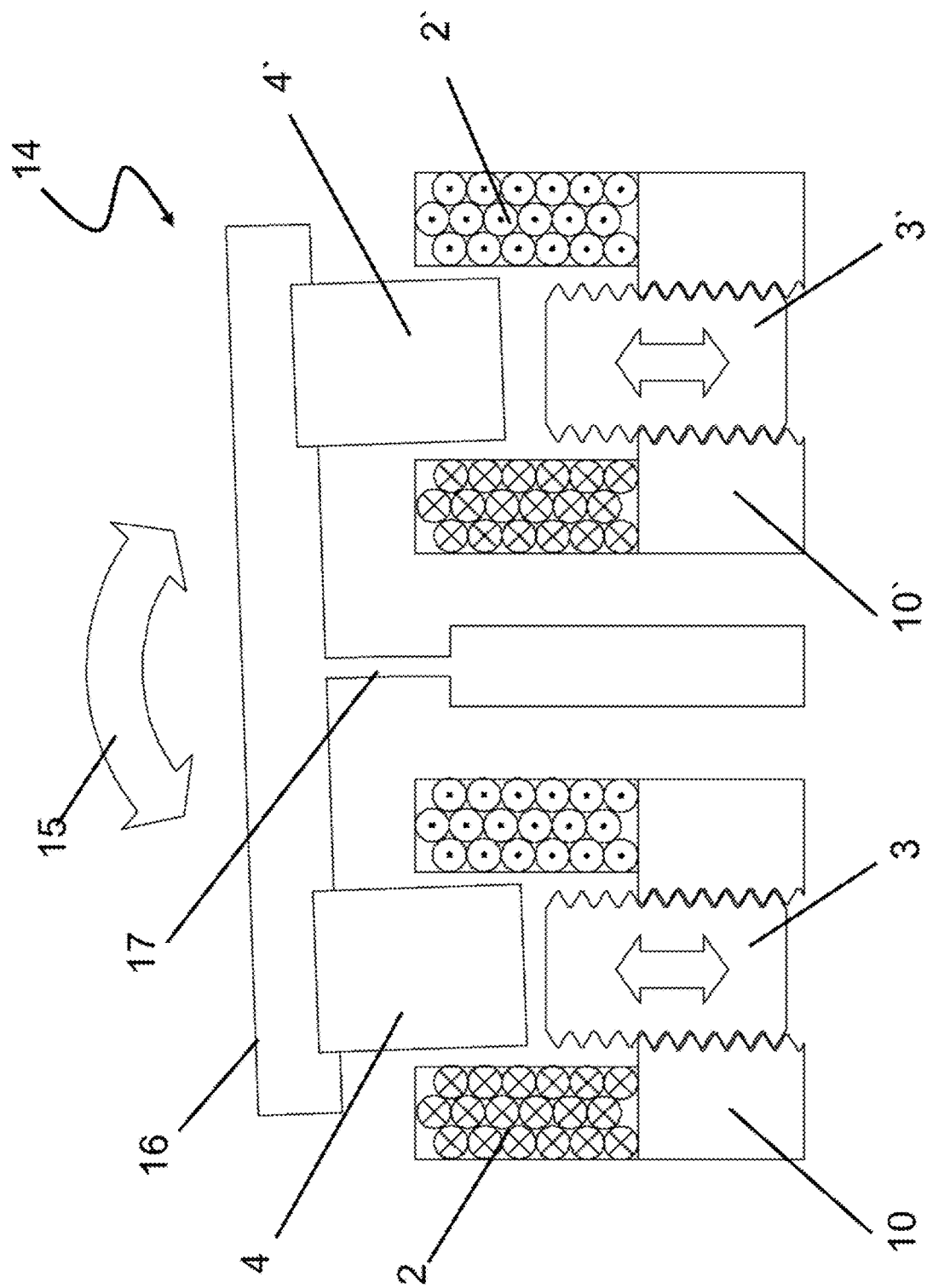

FIG. 10 shows the mechatronic system from FIG. 9 in the tilted state.

Figure 11:
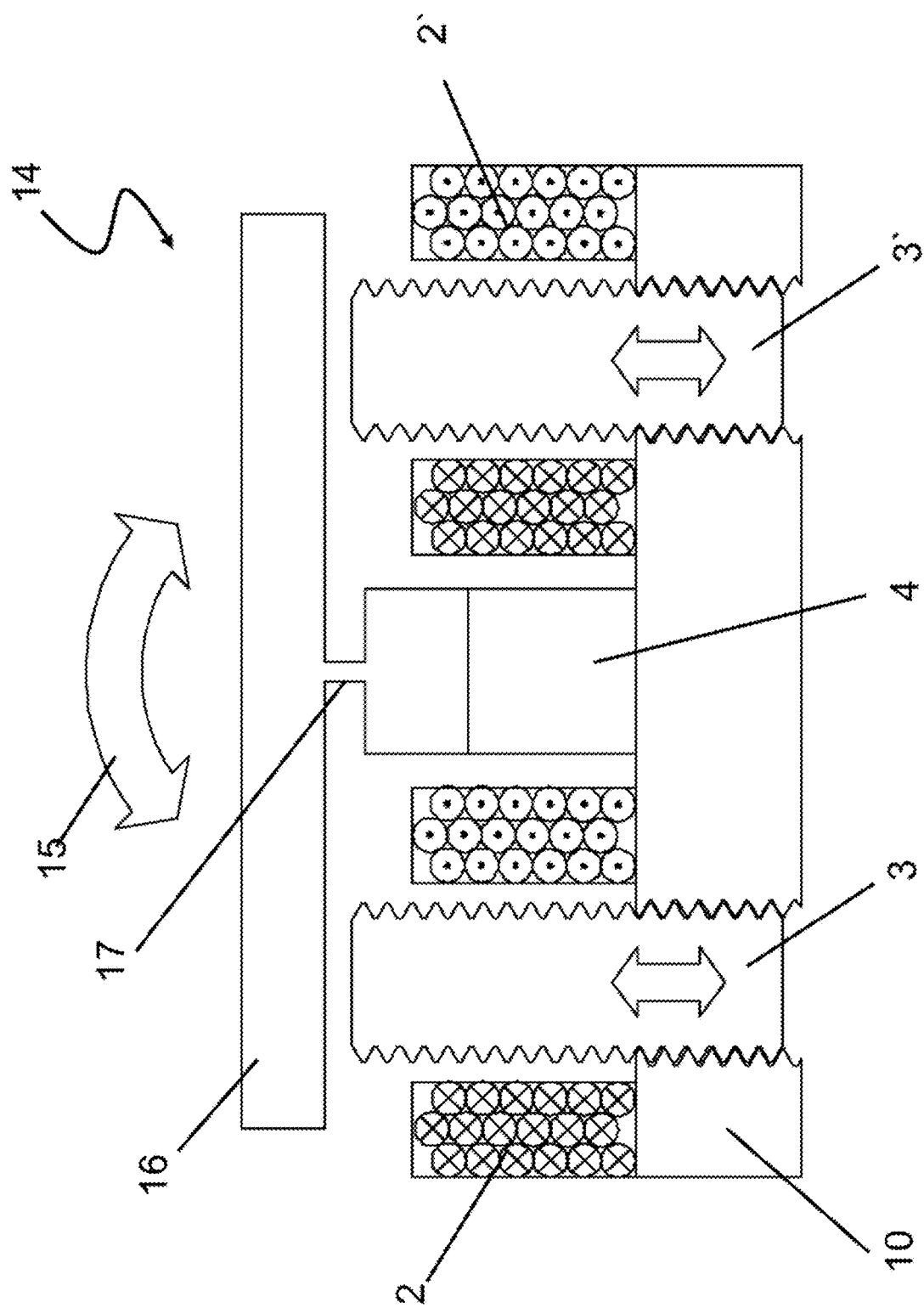

FIG. 11 shows the mechatronic system 14 from FIG. 9 with a permanently magnetic region 4 located in the stator in the base region of the flexure 17. Originating from a permanently magnetic region, a permanent magnet 4 in the example, the magnetic circuit is in this case closed over the flexure 17 and the movable element 16 toward the adjustable actuator core 3.

Figure 12:
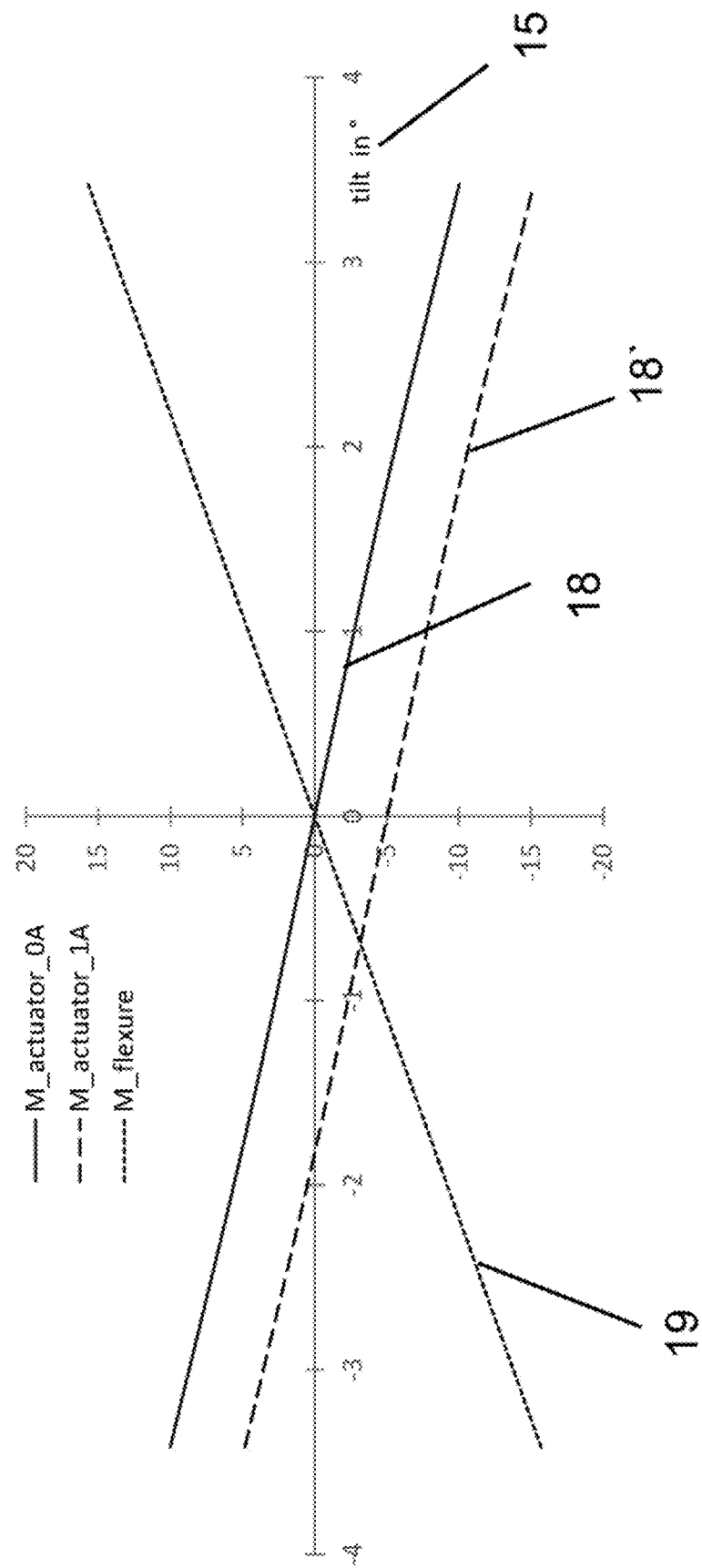

FIG. 12 shows the typical torque graphs of the actuator ("M_actuator_0A") 18 and of the flexure ("M_flexure") 19 as a function of the tilting 15 of the system from FIGS. 9 and 10. Notable in this case is the different arithmetic sign between the actuator and flexure, and therefore correspondingly the arithmetic sign difference in the rigidity. The graph "M_actuator_1A" 18' shows the torque when the actuator coils are energized with a current of 1 Ampere.

Figure 13:
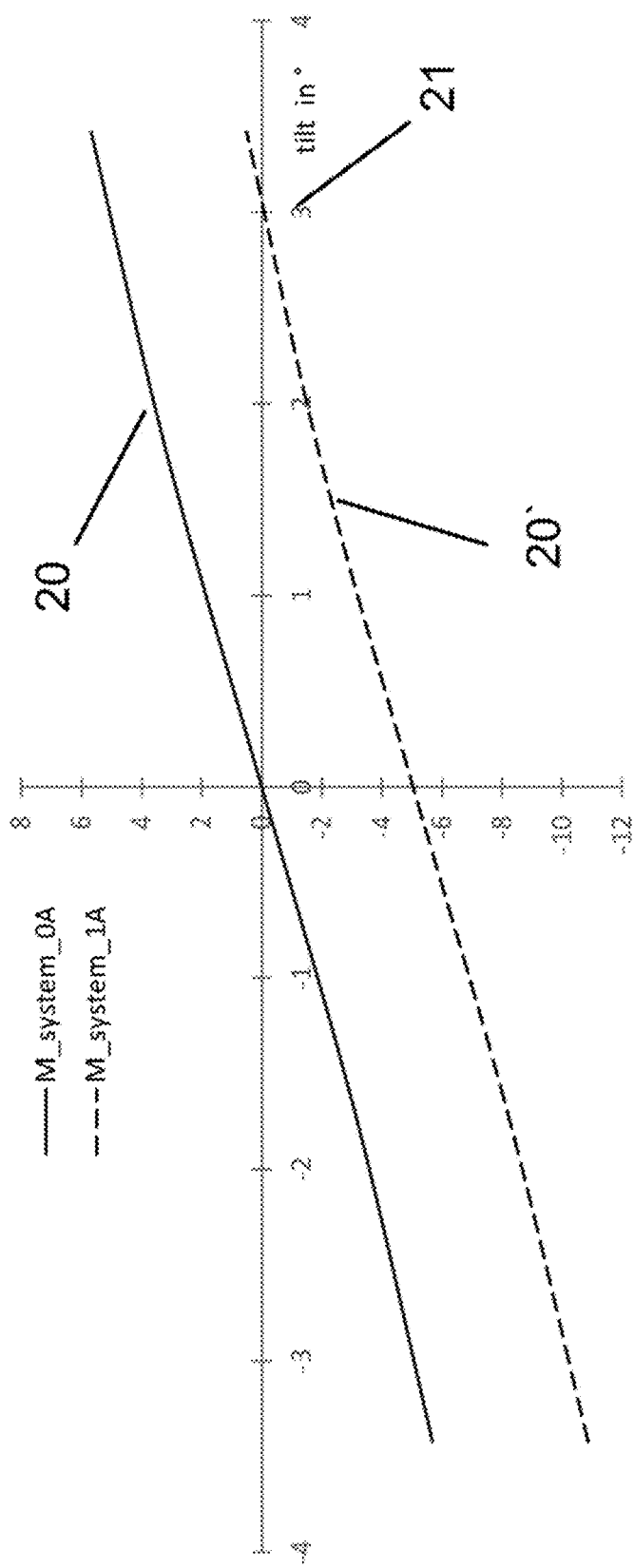

In the diagram in FIG. 13, the actuator rigidity and flexure rigidity compensate each other into an overall system rigidity ("M_system_0A") 20 according to the following formula:

$$M_{system\_0A} = M_{actuator\_0A} + M_{flexure}$$

Further, one sees in the diagram that a coil current of approximately 1 A is required for a deflection of approximately 3°, which is indicated by the zero intersection 21 at 3° of the dotted graph "M_system_1A" 20'.

Figure 14:
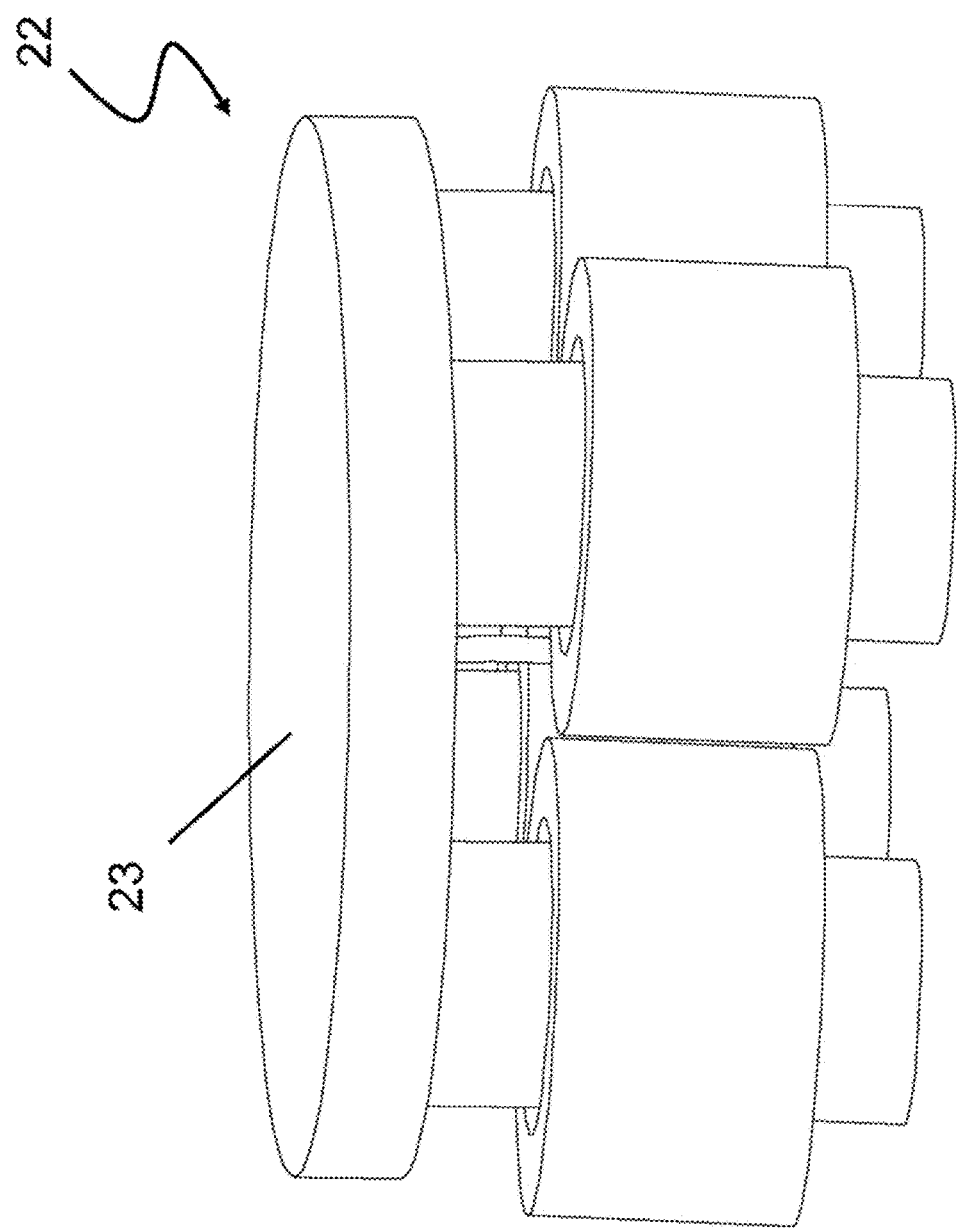

FIG. 14 shows a system 22 enhanced by a further actuator pair rotated by 90°, which permits tilting motions about two axes in space. The system has a reflective region 23 on the upper side. The reflective region 23 can either be a mirror that is mounted on the movable element, or can be produced by a corresponding reflective coating of the movable element.

Figure 15:
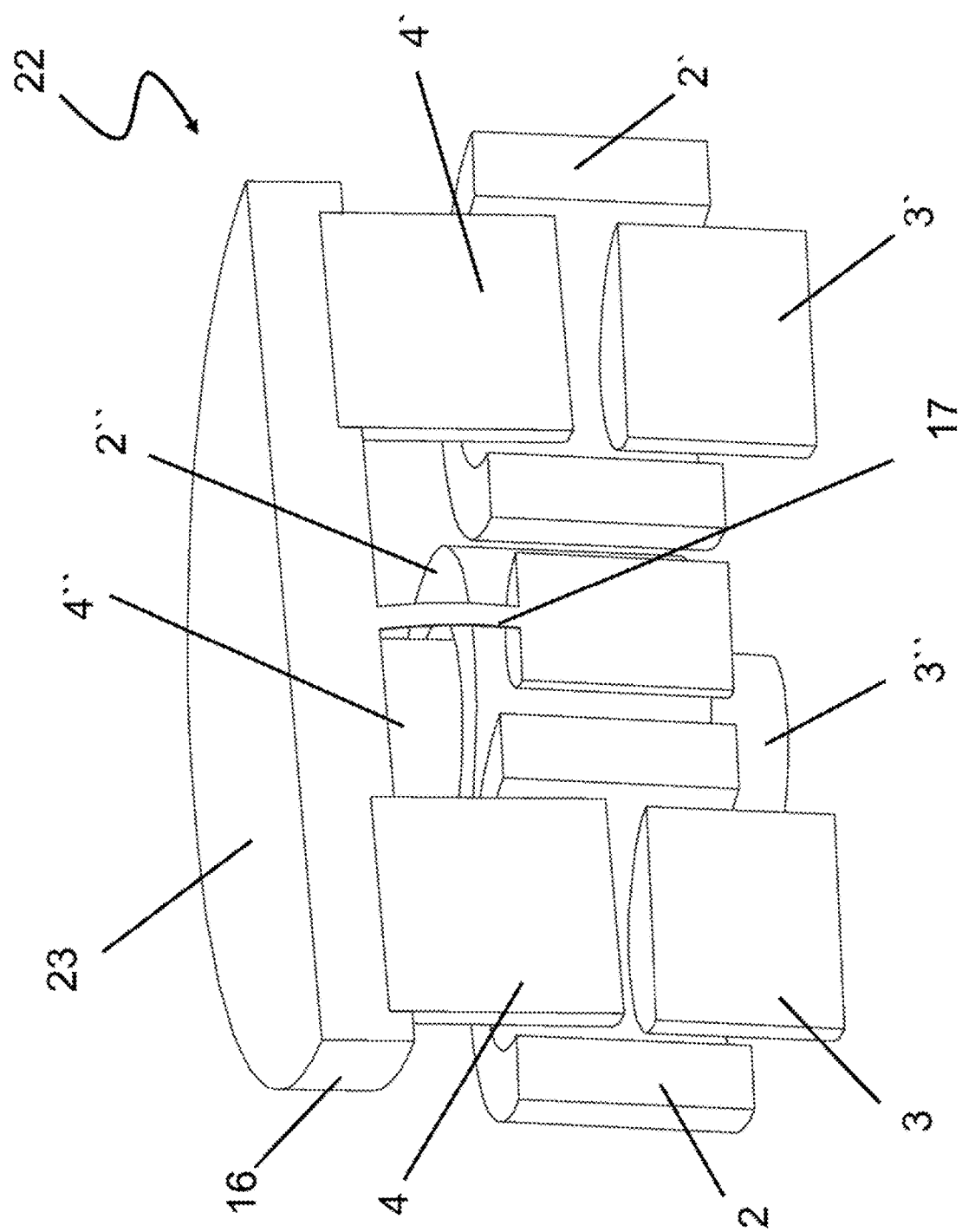

The cross-section diagram in FIG. 15 again clearly shows the movable part 17 with the permanent magnets 4, 4', 4", (magnet 4''' is not shown), the mechanical suspension in the form of a flexure 17 and the coil cores 3, 3', 3" (core 3''' is not shown), which can be varied in their position for the purpose of adjusting the rigidity.

With respect to further advantageous configurations of the teaching according to the invention, reference is made to the brief summary herein-above, along with portions thereof reiterated herein-below to emphasize that the overall system has a rigidity that is made up of the actuator rigidity (substantially corresponding to the rigidity of the magnetic field) and the mechanical rigidity (substantially corresponding to the rigidity of the flexure), the latter being predetermined and constant based on the design of the actuator.

The actuator rigidity results from the static magnetic field that is formed between the second and the third magnetic circuit elements. If the third magnetic circuit element is also a permanently magnetic region, this results in an attracting or repelling force depending on the poling, and therefore in a negative or positive rigidity. The resulting force is attracting if the third magnetic circuit element is a magnetically conductive, paramagnetic material.

The actuator rigidity can be inventively adjusted by providing an adjustable magnetic circuit element whose position is adjustable relative to the position of a further magnetic circuit element. A purposeful adjustment of the adjustable magnetic circuit element modifies the air gap in the magnetic circuit, and a desired rigidity is adjusted due to the dependency of the force on the air gap size. The relationship between the force F and the position z of the adjustable magnetic circuit element (or air gap) is nonlinear. Due to the nonlinearity of the magnetic field, the rigidity is also modifiable by the position of the adjustable magnetic circuit element.

Depending on the arrangement in the actuator or its design, the adjustable magnetic circuit element can be the second magnetic circuit element (permanently magnetic region), or the third magnetic circuit element (permanently magnetic region or magnetically conductive material). The adjustable magnetic circuit element is adapted such that its position can be adjusted relative to a further magnetic circuit element using suitable adjustment means.

Adjustment means can be electrical, pneumatic, thermal, or mechanical means, by which a position is adjustable permanently or also dynamically. Mechanical adjustment means have a particularly simple design and are therefore cost-effective and energy-conserving. The simplest mechanical adjustment means are e.g. washers in a suitable thickness. A more elegant approach is the adjustment using a guide in which the magnetic circuit element is guided and secured with a clamping device, for example by a lateral setscrew. The adjustment element can also be a screw by which the position of the magnetic circuit element is adjusted.

A particularly simple adjustment of the position is possible when a magnetic circuit element itself forms the adjustable element. The magnetic circuit element can for example have a thread, for example a precision thread. The adjustable magnetic circuit element can then be adjusted in its position, for example using a nut, a screw, etc., means engaging into the thread. It is particularly advantageous when the adjustable magnetic circuit element is rotatably guided in its mount, for example the coil carrier, which has a corresponding opposing thread, and is therefore adjustable.

The adjustment of the actuator rigidity can be adjusted to a predetermined value when the actuator is manufactured. It is also conceivable to adjust the actuator rigidity in the respective application only when the actuator is installed. This can be necessary when the resonance frequency and the overall system is changed in the application by additional mass, for example a mirror mounted onto a one-axis or two-axis actuator, and the rigidity must be readjusted as a result.

The position of the adjustable magnetic circuit element could also be adjusted by an electromechanical adjustment. This would also permit automating an adjustment, for example with an automated calibration during manufacturing or in the application itself. The adjustment could then also be performed variably during operations. One could then dynamically adjust the actuator rigidity of the system and therefore its resonance frequency, for example to optimize power consumption or to perform resonant scanning. Resonant scanning in this case means that the actuator rigidity is controlled such that the resonance frequency of the actuator matches the base frequency of the desired movement.

The adjustability is particularly advantageous for actuators that perform a motion in two or more axes. Such actuators can for example perform a tilt movement about one axis or also about two axes displaced in relation to each other by 90°. A home position must frequently be adjusted on such actuators. Without adjustability, all mechanical elements and in particular also the magnetic circuit elements would need to be manufactured and arranged with the tightest tolerances. It is substantially easier and more cost-effective if the adjustment is made during or after manufacturing the actuator by a simple adjustment of the position of at least one magnetic circuit element, by which manufacturing tolerances of the mechanism (in particular of the flexure) and the actuator (magnetic rigidity) are compensated with the calibration procedure. As a result, the natural resonances of the overall system are purposefully adjustable based on manufacturing tolerances, and are therefore reproducible. This results in a reproducible power consumption of the actuator, resulting in a constantly usable controller design.

Such actuators are for example used to guide light in certain spatial directions ("Fast Steering Mirror"). A mirror is for this purpose mounted on the movable element of the actuator. It is particularly advantageous when the movable element itself acts as a mirror based on an appropriate reflective coating, because the actuated masses are in this case reduced, thus achieving high dynamics.

As a result, exemplary advantages of the inventive actuator are: controlled adjustment of the system rigidity for the respective application; that the natural resonance of the system is reproducibly adjustable beyond manufacturing batches; that the natural resonance reproducibly adjustable with manufacturing tolerances results in a reproducible power consumption and a constantly usable controller design; and that the manufacturing tolerances in the flexure and in the actuator are largely eliminated by the calibration procedure.

Lastly, it must expressly be noted that the above-described design examples of the teaching according to the invention serve only to explain the claimed teaching, but do not limit said teaching to these design examples.

The invention claimed is:

1. An electromagnetic actuator having a magnetic circuit comprising three magnetic circuit elements, wherein the magnetic circuit elements exert an attracting or repelling force on one another such that the actuator effects a movement, wherein the position of at least one of the magnetic circuit elements relative to another magnetic circuit element can be adjusted in order to influence the actuator rigidity.

2. The actuator according to claim 1, wherein the magnetic circuit elements are a combination of two or more of a coil, a permanently magnetic region, or a magnetically conductive material.

3. The actuator according to claim 1, wherein the first magnetic circuit element is adapted as a coil and is controlled by the current strength and current direction such that as soon as it is energized by current, an attracting or repelling force controlled by the current flow is exerted on the second magnetic circuit element adapted as a permanently magnetic region.

4. The actuator according to claim 1, wherein the third magnetic circuit element is adapted as a permanently magnetic region or as a magnetically conductive material, wherein the third magnetic circuit element is used at least one of to shape, to guide, or to amplify the magnetic field of at least one of the first or the second magnetic circuit element.

5. The actuator according to claim 1, wherein the cooperation of the second and third magnetic circuit element generates a static force induced by the static magnetic field acting between them, the static force depending on the distance between the two magnetic circuit elements.

6. The arrangement according to claim 1, wherein a permanently magnetic region is located in the movable part of the actuator, and in that the distance of an actuator core to the permanently magnetic region is modified.

7. The arrangement according to claim 1, wherein a magnetically conductive material is located in the movable part of the actuator, and a permanently magnetic region is arranged at a distance to the movable part.

8. The arrangement according to claim 1, wherein the permanently magnetic region is a permanent magnet or a permanently magnetized region.

9. The arrangement according to claim 1, wherein the position of any of the magnetic circuit elements is adjusted by a mechanical means or by an electromechanical means.

10. The arrangement according to claim 1, wherein the arrangement of the magnetic circuit elements is duplicated mirror-symmetrically in order to effect a tilt movement.

11. The arrangement according to claim 10, wherein the arrangement of the magnetic circuit elements is duplicated rotated by 90°, whereupon a two-dimensional tilt movement can be actuated.

12. The arrangement according to claim 9, wherein the mechanical means is a thread.

* * * * *